US012130012B2

(12) United States Patent
Tadiello et al.

(10) Patent No.: US 12,130,012 B2
(45) Date of Patent: Oct. 29, 2024

(54) FURNACE FOR ENDOTHERMIC PROCESS AND PROCESS FOR OPERATING A FURNACE WITH IMPROVED BURNER ARRANGEMENT

(71) Applicant: L'AIR LIQUIDE, SOCIETE ANONYME POUR L' ETUDE ET L' EXPLOITATION DES PROCEDES GEORGES CLAUDE, Paris (FR)

(72) Inventors: Jean-Philippe Tadiello, Frankfurt am Main (DE); Diana Tudorache, Bures sur Yvette (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 770 days.

(21) Appl. No.: 17/290,535

(22) PCT Filed: Oct. 28, 2019

(86) PCT No.: PCT/EP2019/025367
§ 371 (c)(1),
(2) Date: Apr. 30, 2021

(87) PCT Pub. No.: WO2020/088795
PCT Pub. Date: May 7, 2020

(65) Prior Publication Data
US 2022/0113023 A1     Apr. 14, 2022

(30) Foreign Application Priority Data
Nov. 1, 2018 (EP) .................................. 18020568

(51) Int. Cl.
*F23C 5/08* (2006.01)
*C01B 3/32* (2006.01)
*F23C 13/00* (2006.01)

(52) U.S. Cl.
CPC ................ *F23C 5/08* (2013.01); *C01B 3/323* (2013.01); *F23C 13/00* (2013.01);
(Continued)

(58) Field of Classification Search
CPC .............. F23C 2900/03002; F23C 5/08; F23C 2900/05081
See application file for complete search history.

(56) References Cited

U.S. PATENT DOCUMENTS 2,852,358 A * 9/1958 Stengel ..................... C01B 3/40
422/201
2,894,826 A * 7/1959 Stengel .................... B01J 8/062
518/703

(Continued)

FOREIGN PATENT DOCUMENTS

| EP | 1 783 425 | 5/2007 |
| EP | 2 314 543 | 4/2011 |

(Continued)

OTHER PUBLICATIONS

International Search Report and Written Opinion for corresponding PCT/EP2019/025367, Dec. 2, 2019.

*Primary Examiner* — Jorge A Pereiro
(74) *Attorney, Agent, or Firm* — Elwood L. Haynes

(57) ABSTRACT

The invention relates to a furnace for performing an endothermic process, the furnace including a plurality of process tubes containing a catalyst for converting a gaseous feed, wherein the process tubes are arranged in rows within the furnace, each row of process tubes thereby defining a process tube row, a plurality of inner burners arranged in rows, each row of inner burners being arranged between and parallel to process tube rows, thereby defining an inner burner row, and a plurality of outer burners arranged in rows, each row of outer burners being arranged between and parallel to a process tube row and a furnace wall, thereby (Continued)

defining an outer burner row. A number of burners of an outer burner row is smaller than a number of burners of an inner burner row. The invention also relates to a process for operating a furnace for performing an endothermic process.

13 Claims, 4 Drawing Sheets

(52) U.S. Cl.
CPC .......... *C01B 2203/0233* (2013.01); *C01B 2203/0811* (2013.01); *C01B 2203/1241* (2013.01); *F23C 2900/03002* (2013.01)

(56) References Cited

U.S. PATENT DOCUMENTS

| | | | | |
|---|---|---|---|---|
| 3,119,671 A * | 1/1964 | James | ............... | B01J 8/062 422/652 |
| 5,795,148 A * | 8/1998 | DiMartino, Sr. | ......... | F23M 9/02 431/20 |
| 2003/0131533 A1 * | 7/2003 | Pham | ............... | B01J 8/06 422/204 |
| 2004/0134127 A1 * | 7/2004 | Pham | ............... | B01J 8/062 422/204 |
| 2006/0277828 A1 * | 12/2006 | Licht | ............... | B01J 8/062 48/198.1 |
| 2007/0099141 A1 * | 5/2007 | Joshi | ............... | F23C 5/08 431/354 |
| 2008/0290322 A1 * | 11/2008 | Hederer | ............ | B01J 8/065 252/373 |
| 2010/0189638 A1 | 7/2010 | Giroudiere et al. | | |
| 2010/0248169 A1 * | 9/2010 | Morgan | ............. | F23C 5/06 431/18 |
| 2011/0113993 A1 * | 5/2011 | Esmaili | ............. | B01J 12/007 110/190 |
| 2011/0220847 A1 * | 9/2011 | Hendershot | ........ | F23C 5/08 252/373 |
| 2012/0259147 A1 * | 10/2012 | Payne | ............. | C10G 9/00 422/198 |
| 2014/0105243 A1 * | 4/2014 | Tait | ............. | G01K 3/04 374/102 |
| 2015/0239736 A1 * | 8/2015 | Martin | ............ | C01B 3/386 252/373 |
| 2015/0239736 A1 | 8/2015 | Martin et al. | | |
| 2016/0018104 A1 * | 1/2016 | Martin | ............ | F23D 14/34 431/201 |

FOREIGN PATENT DOCUMENTS

| | | | | |
|---|---|---|---|---|
| EP | 2314543 A1 * | 4/2011 | ......... | B01J 8/062 |
| EP | 2 369 229 | 9/2011 | | |
| EP | 2 708 812 | 3/2014 | | |
| EP | 3 182 003 | 6/2017 | | |
| EP | 3 279 561 | 2/2018 | | |

* cited by examiner 303a　　303b　　303b
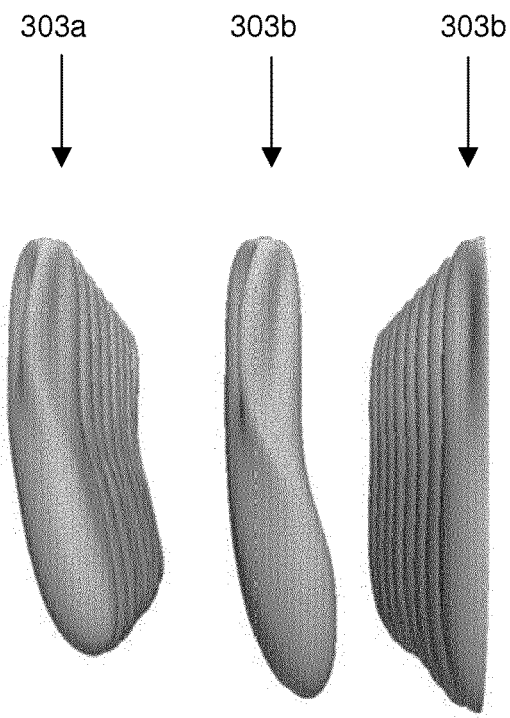
Fig. 3a
313a　　313b　　313b
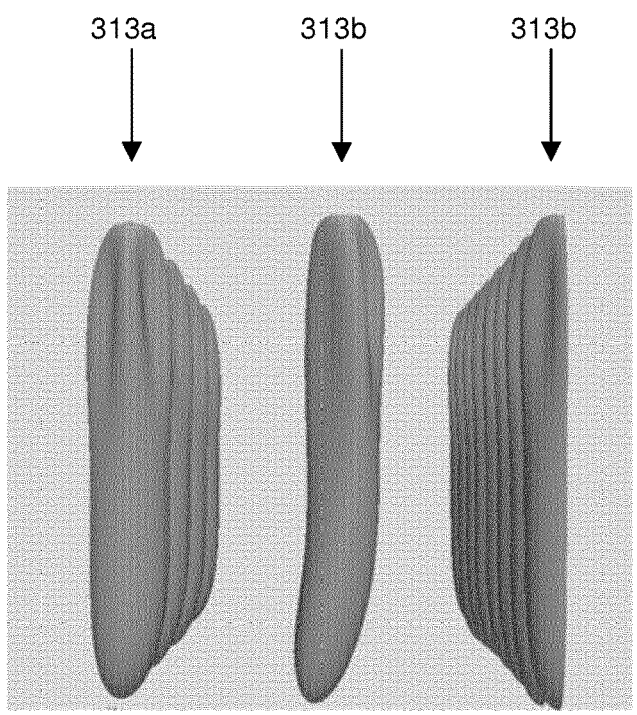
Fig. 3b
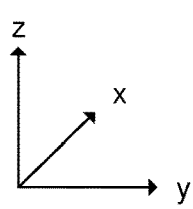

FURNACE FOR ENDOTHERMIC PROCESS AND PROCESS FOR OPERATING A FURNACE WITH IMPROVED BURNER ARRANGEMENT

CROSS REFERENCE TO RELATED APPLICATIONS

This application is a 371 of PCT/EP2019/025367, filed Oct. 28, 2019, which claims priority to EP 18020568.4, filed Nov. 1, 2018, the entire contents of which are incorporated herein by reference.

BACKGROUND

Technical Field

The invention relates to a furnace for performing an endothermic process. In particular, the present invention relates to a furnace for steam methane reforming (SMR) and other endothermic reactions like hydrocarbon feedstock cracking in externally heated reactors. The invention relates further to a process for operating a furnace for performing an endothermic process.

Background Art

The SMR process is mainly based on a reforming reaction of light hydrocarbon gases such as methane that yields to a mixture of hydrogen ($H_2$) and carbon monoxide (CO) in the presence of water vapour. The reaction is highly endothermic and slow and requires additional heat input, as well as a catalyst to occur. SMR reactor performances are usually limited by the heat transfer and not by the kinetics of the chemical reactions.

In industrial practice, a SMR reactor comprises a plurality of catalyst filled process tubes placed within a furnace. Catalyst media used for filling the process tubes comprise pellets and structured catalysts. The process tubes are fed with the process gas mixture comprising methane and water vapour. Process tubes are heated by a plurality of burners placed adjacent to the process tubes.

Several burner configurations are known in the art, which comprise down-fired (also referred to as "top fired"), up-fired (also referred to as "bottom fired"), side fired and terrace wall arranged burners.

The down-fired technology is most common and proposed by several technology providers. Down-fired furnaces are typically made of a refractory lined firebox (the furnace) containing several rows of catalyst filled process tubes. The necessary heat for the endothermic reaction to occur is provided by burners mounted on the firebox roof. Such burners are arranged in rows between the process tubes and additionally arranged in rows at the furnace sides, along the walls of the furnace. The combustion products of the burners are usually blown vertically downwards, so that process tubes face the flames in their upper part. A flue gas exhaust collector is provided at the furnace floor level.

The up-fired technology is less common. Here the burners are arranged in rows on the floor of the firebox, firing vertically upwards. Again, the burners are arranged in rows between the process tubes and additionally arranged in rows at the furnace sides, along the walls of the furnace.

An objective of the furnace design is to optimize heat transfer from burners to process tubes. Heat is transferred from the burner flames, the walls of the furnace and the hot flue gas. In this regard, a maximal tube operating temperature (MOT) has to be considered. The MOT is a function of several factors, and particularly of the tube mechanical load (i.e. the feed gas pressure), the mechanical properties of the alloys used for process tube manufacture and the desired lifetime of the process tubes which are exposed to creep and thermal aging.

A lack of homogeneity of heat distribution in the furnace will result in some of the tubes being hotter than others, so that the performance of the furnace is limited by the temperature of the hottest tube. Said hottest tube should not exceed the MOT. However, the performance of the process (inter alia productivity, efficiency of conversion) depends on the average process tube heat flux and temperature. The smaller the difference between the hottest process tube temperature and the average process tube temperature, the better the process performance of the furnace. It is therefore an object to reach a homogeneity of heat distribution in the furnace as well as possible.

Following explanations are related to down-fired furnaces, but apply for up-fired furnaces as well. In a typical down-fired furnace, the burners arranged in rows between process tube rows have process tubes on either side. The burners arranged between a process tube row and the furnace wall will have process tubes only on one side of the burner. Hence, there is twice as much heat transfer requirement in a burner row between process tubes than in a burner row between process tubes and the refractory wall of the furnace. As a consequence, the burners arranged between a process tube row and the furnace wall (also referred to as "outer burners" or "outer row burners" or "OR burners" or "ORB") require, in theory, only a firing rate of 50% compared to burners arranged between two process tube rows (also referred to as "inner burners" or "inner row burners" or "IR burners" or "IRB"). Including heat losses of the furnace wall, the required firing rate of an OR burner is about 52% compared to the required firing rate of an IR burner arranged between process tube rows. The same considerations apply for the mass flow rate Q, which stands in direct relation to the firing rate and which is defined as $$Q = \rho S u$$

wherein $\rho$ is the mass density of the fluid injected to the burners, S is the cross-sectional surface of a burner and u is the mean velocity of the air/fuel mixture injected through the burner nozzle(s).

Considering the lower firing rate (and therefore lower mass flow rate) of OR burners, the power of the OR burners can be reduced, for instance, by using an OR burner design which is identical or at least similar to the IR burner design and throttling the amount of combustion air and/or fuel provided to an OR burner. The resulting differences between mass flow rates of OR and IR burners are expressed through the equation $$Q_{ORB} = \alpha Q_{IRB}$$

wherein $Q_{ORB}$ is the mass flow rate for the outer row burners, $Q_{IRB}$ is the mass flow rate for the inner row burners and a is the flow rate ratio between an outer row and inner row burner, with $0 < \alpha < 1$.

Accordingly, for an "ideal" firing rate of 52% of an OR burner in relation to the firing rate of an IR burner and given that the mass density of the fluid and cross-sectional surface areas of the burners are equal, the velocity of the streams (combustion air and fuels) at an OR burner nozzle is also only 52% in relation to the velocity of the IR burner streams, expressed through the following equation, $$u_{ORB} = \alpha u_{IRB}$$

wherein $u_{ORB}$ is the mean velocity of the air/fuel mixture injected through the outer row burner nozzle and $u_{IRB}$ is the mean velocity of the air/fuel mixture injected through the inner row burner nozzle.

The parallel jets behaviour of the burner flames is affected to a large degree by their relative momentum flux J, which is defined by the following equation:

$$J=\rho Su^2$$

As a consequence, due to the lower velocity at the burner nozzle of an OR burner compared to an IR burner, also the momentum flux of the combustion product flow of an OR burner will be significantly lower than the momentum flux of the combustion product flow of an IR burner. However, jets with higher momentum flux will attract jets with lower momentum flux, so that the flame jet of an IR burner will attract the flame jet of an OR burner. The reason for this is that the higher momentum flux of an IR burner will create a lower static pressure zone at the burner discharge area near the top of an IR burner than is present at the top of an OR burner. The static pressure difference causes the combustion products from the OR burners to flow toward the center of the firebox, a phenomenon known as "flame bending" of the flames of IR and OR burners. Due to the heat thus being transferred towards the center of the firebox, the outer rows of the tubes, i.e. the rows closest to the furnace wall, find themselves under heated with respect to the tubes of the inner rows. To compensate for the heat transferred towards the inner rows tubes, the OR burners are commonly operated at firing rates higher than 52%, usually being between 60% and 80% of the firing rate of the IR burners. Nevertheless, when this interaction between flames occurs, it is difficult to equilibrate the heat duty among the process tube rows, regardless of the level of load.

A proposed solution to the above problem is to use OR burners with smaller outlet dimensions ($S_{ORB}<S_{IRB}$) and increasing the velocity of the outer row burner at the same time ($u_{ORB}>u_{IRB}$) to create a uniform momentum flux for the inner and outer row burners ($J_{ORB}=J_{IRB}$). Therefore, US 2015/0239736 A1 teaches to modify the OR burners discharge velocity to be higher than the discharge velocity of the IR burners. The discharge velocity of the OR burners is increased by reducing the area of the burner discharge flow restriction for the OR burners. The reduced flow area will increase the required combustion air pressure in the OR burners relative to the IR burners, which can be achieved by modifications to the combustion air supply system of the furnace. The necessity for combustion air pressure discrepancies between OR and IR burners can alternatively be eliminated by design modifications to the IR burners. Accordingly, the solution proposed in US 2015/0239736 A1 either requires modifications to the combustion air supply system of the furnace or design modifications to the IR burners.

U.S. Pat. No. 7,686,611 B2 discloses a method and apparatus for generating straightened flames in a furnace. The method and corresponding apparatus involves the addition of oxidant conduits to introduce an oxidant to the fuel.

U.S. Pat. No. 5,795,148 attempts to cure the problem of unstable flame patterns and finds that wind external to the furnace is a contributing factor of the problem. Therefore, U.S. Pat. No. 5,795,148 teaches an apparatus that controls the amount of air received by the furnace burners and provides uniform air pressure going to the burners.

According to EP 2 369 229, a plurality of oxidant and fuel conduits are added to the burners so as to modify the behaviour of the flames.

EP 2 708 812 A1 proposes a solution for an up-fired reformer wherein the OR burners should be positioned close to the furnace walls to prevent the OR burner flames bending towards IR burner flames. The ORB should be positioned close enough to the adjacent wall, so that Coanda effect forces overcome the entrainment of the OR burner jets by the IR burner jets.

All of the proposed solutions require important modifications in regard to the firing system, either with the burner itself or with the burner distribution manifolds. Further disadvantages are the requirement of different burner types, at least two different burners to be tested before commissioning, difficulties in pressure drop control when using different burners and difficulties in the design of the distribution system of burner streams.

SUMMARY

It is therefore an object of the present invention to provide a furnace for performing an endothermic process which overcomes or at least mitigates the above mentioned problems.

It is a further object of the present invention to provide a furnace for performing an endothermic process with eliminated or at least reduces flame bending phenomenon between the burner rows, in particular without the need for significant constructive changes of the burners.

It is a further object of the present invention to provide a furnace with improved heat distribution homogeneity, in particular without the need for significant constructive changes of the burners.

It is a further object of the present invention to provide a furnace with improved performance, in particular productivity and efficiency of conversion, in particular without the need for significant constructive changes of the burners.

It is a further object of the present invention to provide a furnace which is easier to design regarding the common system of combustion air and fuel streams, thereby providing a same range of operating loads for all burners.

It is a further object of the present invention to provide a process for operating a furnace for performing an endothermic process which overcomes or at least mitigates the above mentioned problems and addresses the above mentioned objects.

This is achieved by the subject matter of the independent claims. Further embodiments are described in the dependent claims.

In general, a furnace for performing an endothermic process comprises a plurality of process tubes containing a catalyst for converting a gaseous feed, wherein said process tubes are arranged in rows within the furnace, each row of process tubes thereby defining a process tube row, a plurality of inner burners arranged in rows, each row of inner burners being arranged between and parallel to process tube rows, thereby defining an inner burner row, and a plurality of outer burners arranged in rows, each row of outer burners being arranged between and parallel to a process tube row and a furnace wall, thereby defining an outer burner row, characterized in that a number of burners of an outer burner row is smaller than a number of burners of an inner burner row.

A furnace according to the invention comprises multiple rows of burners, with at least one inner burner row arranged between two adjacent process tube rows, and at least two outer burner rows, each of the outer burner rows arranged between a process tube row and a furnace wall. According to the invention, the number of burners of an outer burner row is reduced with regard to the number of burners of an inner burner row. According to this configuration of burners, the flame jet bending phenomenon between inner and outer burners is eliminated or at least significantly reduced. Furthermore, heat transfer discrepancies among the process tubes are avoided.

A "row" according to the invention means that a certain number of a defined element is arranged in a designated direction and in a consecutive manner, in particular without further elements intercalating within the row of consecutive elements. For instance, a "row of burners" according to the invention means that a certain number of burners is arranged in a consecutive manner, without further elements being arranged between two consecutive burners of a burner row. Such a further element could be, for instance, a process tube. The same considerations apply, for instance, for a "row of process tubes".

A row of outer burners is arranged between and parallel to a process tube row and a furnace wall. The "furnace wall" parallel to burner rows and/or process tube rows may also be referred to as "parallel sided" wall, Usually, but not necessarily, a furnace according to the invention comprises two facing parallel sided walls. The furnace walls arranged perpendicular to the rows of burners and process tubes may also be referred to as "vertically sided" walls, Usually, but not necessarily, a furnace according to the invention comprises two facing vertically sided walls.

According to an embodiment, the number of burners of an outer burner row is smaller than a number of burners of an inner burner row adjacent to an outer burner row. The flame bending phenomenon mostly occurs between outer burners of an outer burner row and inner burners of an inner burner row adjacent to aforementioned outer burner row. It is therefore preferred to reduce the number of burners of an outer burner row with regard to the number of burners of an inner burner row which is adjacent to an outer burner row.

According to an embodiment, the ratio of the number of burners of an outer burner row to the number of burners of an inner burner row is in a range of 0.25 to 0.75, preferably in a range of 0.4 to 0.6, more preferably in a range of 0.45 to 0.55. More preferred, the ratio of the number of burners of an outer burner row to the number of burners of an inner burner row is 0.5. Because burners of an outer burner row are arranged between a process tube row and the furnace wall, those burners will have process tubes only on one side of the burner row. Hence, in an ideal case, there is half as much heat transfer requirement in a burner row arranged between a process tube row and the refractory wall of the furnace wall than in an inner burner row arranged between two process tube rows. For such an ideal case, the number of burners of an outer burner row should be half of the number of burners of an inner burner row, in particular of the inner burner row adjacent to the outer burner row. For furnaces with uneven numbers of burners per row, in particular per inner burner row, said ideal case cannot be achieved and the ratio of the number of burners of an outer burner row to the number of burners of an inner burner row will deviate from 0.5. Furthermore, the ratio of the number of burners of an outer burner row to the number of burners of an inner burner row has to be adapted subject to local specifics of the furnace, such as larger distances between burners and/or process tubes belonging to different sections of the furnace.

According to an embodiment, each inner burner row of the furnace comprises the same number of burners and/or each outer burner row of the furnace comprises the same number of burners. To further reduce the flame merging phenomenon, and to further reduce the range of tube temperatures along the rows of tubes, the furnace layout should be as uniform and/or symmetrical as possible with regard to the arrangement of burners, taking into account the reduced number of burners of the outer burner rows.

According to an embodiment, the outer burners are configured for operating with a firing rate which is in the range of 85 to 115% of the firing rate of the inner burners, preferably in a range of 90 to 110% of the firing rate of the inner burners, more preferably in a range of 95 to 105% of the firing rate of the inner burners, It is a main advantage of the present invention that, by reducing the number of outer burners in relation to inner burners per row, that the inner burners and outer burners can be operated with same or at least similar firing rates. Accordingly, inner and outer burners will also have same or at least similar mass flow rates ($Q_{ORB}=Q_{IRB}$ or $Q_{ORB}\approx Q_{IRB}$) and a same or at least similar momentum flux J. With same or at least similar firing rates, mass flow rates and momentum fluxes, not only the flame bending phenomenon is eliminated or at least reduced, but also same burners with no or at least minimum structural differences may be applied.

Therefore, according to a further embodiment, the outer burners and the inner burners are configured for operating with an equal nominal firing rate. In this context, "equal nominal firing rate" means that the desired or target value for the parameter "firing rate" is equal for each burner, in particular equal for inner and outer burners. In practice, the measured firing rates may deviate from the nominal firing rates set for each of the burners of the furnace.

According to an embodiment, the inner row burners and the outer row burners are constructed identically. It is preferred to use identical burners both for outer row burners and inner row burners, for instance to ensure the same momentum flux J for the combustion products discharged from the burner nozzles. Since the number of burners of an outer burner row is reduced compared to the number of burners of an inner burner row, a smaller amount of heat will be provided to the process tube row or rows adjacent to the outer burner rows. For the case that the ratio of the number of burners of an outer burner row to the number of burners of an inner burner row is 0.5 or in a range around and comprising 0.5, for example 0.45 to 0.55, the same or at least nearly the same amount of heat will be provided to each process tube row. Since the inner and outer row burners will have the same pressure drop, the inlet manifolds for the air and the fuel streams will be easier to design. Furthermore, the inner and outer row burners will have the same response to load change with regard to air and/or fuel load, and the furnace can be run at lower loads when required. Overall, using identically constructed burners for the furnace as a whole also simplifies design of the furnace as such.

According to an embodiment, the outer burners of an outer burner row are aligned offset, at least in part, along the direction of the burner rows, to the inner burners of an inner burner row. In this connection, "aligned offset, along the direction of burner rows, to the inner burners of an inner burner row" means the following, Assumed that an imaginary line arranged perpendicular to a (parallel sided) furnace wall crosses the center of an inner row burner of an inner burner row, then the same line will not cross the center of an outer row burner of an outer burner row, because the respective outer row burner is arranged offset to the line crossing the center of the inner row burner. Outer burners of outer burner rows may be aligned offset to inner burners of inner burner rows adjacent to outer burner rows and/or further inner burners of inner burner rows non-adjacent to outer burner rows.

In a further preferred embodiment, the outer burners of an outer burner row are aligned offset, at least in part, along the direction of the burner rows, to the inner burners of an inner burner row, such that the outer burners are arranged in the middle between two inner burners of an inner burner row, preferably in the middle between two burners of an inner burner row adjacent to an outer burner row. In this connection, "in the middle" means the following. It is assumed that two imaginary lines, each line arranged perpendicular to a (parallel sided) furnace wall, respectively cross a center of two inner burners of an inner burner row. The two inner burners are arranged adjacent to each other within the inner burner row. To be arranged "in the middle" between two inner burners of an inner burner row, the outer burner is arranged such that the distance from the center of the outer burner to each one of the two lines is equal or at least essentially equal.

According to an embodiment, a distance between two inner burners of an inner burner row is IB2IB, and the distance between two outer burners of an outer burner row is OB2OB, and wherein the inner and outer burners in the rows are arranged in such a way that a ratio of IB2IB to OB2OB is 0.3 to 0.81, preferably 0.4 to 0.71 and more preferably 0.5 to 0.61. By reducing the number of burners of an outer burner row, at the same time the distances between outer burners is increased in comparison to distances between inner row burners. By reducing the number of outer burners per outer burner row and increasing the distance at the same time, heat distribution in the furnace is improved with regard to homogeneity. That is to say, a more homogenous heat profile in the furnace as a whole is accomplished.

According to an embodiment, the inner burner rows, the outer burner rows and the process tube rows are ended by vertically sided walls arranged perpendicular to the inner burner rows, the outer burner rows and the process tube rows, and wherein the inner burner rows, the outer burner rows and the process tube rows are divided into sections with the distance from an end inner burner or an end outer burner to the vertically sided wall being B2W, the distance between two adjacent inner or outer burners in the section being B2B, and half the distance in-between two sections being B2S, wherein the inner and outer burners in the rows are arranged in such a way that the ratios B2B/B2W and B2B/B2S are greater than 1.3, preferably greater than 1.6 and more preferably greater than 1.8. Such an arrangement further avoids the occurrence of the flame merging phenomenon within rows and reduces significantly the quadratic mean of the tube temperature profile, as explained in detail in European patent application EP 3 182 003 A1, which is hereby incorporated by reference as a whole.

According to an embodiment, the burner rows and the process tube rows are ended by vertically sided walls arranged perpendicular to the burner rows and the process tube rows, and wherein the burner rows and the process tube rows are divided into sections with, on each row of process tubes, the distance from a wall end process tube to the vertically sided wall being T2W, the distance between two adjacent inner process tubes in a section being T2T, and the distance between two symmetry end process tubes of two adjacent sections being T2S, wherein the process tubes in the rows are arranged in such a way that the ratios T2T/T2W and T2T/T2S are greater than 0.5 and smaller than 2, preferably greater than 0.75 and smaller than 1.75. Such an arrangement further avoids the heat discrepancies of end-of-section tubes as explained in detail in European patent application EP 3 279 561 A1, which is hereby incorporated by reference as a whole.

According to an embodiment, the outer burners are positioned such that the distance of the central axis of the outer burners to the furnace wall is less than 25% of the distance between the outermost tubes and the furnace wall, preferably less than 10%, more preferably less than 5%, most preferably less than 2%. By placing the outer burners close to the furnace wall, the flame merging phenomenon as well as the problem of overheating the process tubes will further be reduced, as explained in detail in European patent application EP 2 708 812 A1, which is hereby incorporated by reference as a whole.

According to an embodiment, the burners are mounted to a furnace roof configured for a down-fired arrangement or the burners are mounted to a furnace floor configured for an up-fired arrangement. By reducing the number of outer burners per row compared to the number of inner burners per row, the flame bending phenomenon is avoided most successfully in down-fired or up-fired arrangements.

According to an embodiment, the furnace according to the invention is a steam methane reforming furnace. The furnace according to the invention is preferably used in, but not limited to, steam methane reforming processes. In steam methane reforming processes, natural gas comprising methane as the major component is reacted with steam to obtain synthesis gas, a gas mixture comprising at least hydrogen and carbon monoxide. The furnace according to the invention may be used in similar processes in which carbon containing feedstocks are converted by heat input to gas mixtures, with or without using a catalyst.

In general, a process for operating a furnace for performing an endothermic process with a plurality of catalyst containing process tubes for converting a gaseous feed comprises that said process tubes are arranged in rows within the furnace, each row of process tubes thereby defining a process tube row, a plurality of inner burners arranged in rows within the furnace, each row of inner burners being arranged between and parallel to process tube rows, thereby defining an inner burner row, and a plurality of outer burners arranged in rows within the furnace, each row of outer burners being arranged between and parallel to a process tube row and a furnace wall, thereby defining an outer burner row, whereby the burners of an outer burner row are heating at least one row of adjacent process tubes and the burners of an inner burner row are heating at least two rows of adjacent process tubes, is characterized in that the outer burners are operating with a firing rate which is in a range of 85 to 115% of the firing rate of the inner burners. inner and outer burners operating with equal or at least similar firing rates will less be subject to the flame merging phenomenon, thus heat distribution within the furnace is more homogeneous compared to processes in which inner burners and outer burners are operated with more differing firing rates. A consequence of equal or at least similar firing rates of inner and outer burners is that also mass flow rates $Q_{ORB}$ and $Q_{IRB}$ are equal or at least similar. This will in turn result in equal or at least similar momentum fluxes of inner and outer burners and the flame bending phenomenon is avoided. For operating the outer burners with a firing rate which is in a range of 85 to 115% of the firing rate of the inner burners, a number of burners of an outer burner row is smaller than a number of burners of an inner burner row.

Accordingly, an alternative general process for operating a furnace for performing an endothermic process with a plurality of catalyst containing process tubes for converting a gaseous feed may comprise that said process tubes are arranged in rows within the furnace, each row of process tubes thereby defining a process tube row, a plurality of inner burners arranged in rows within the furnace, each row of inner burners being arranged between and parallel to process tube rows, thereby defining an inner burner row, and a plurality of outer burners arranged in rows within the furnace, each row of outer burners being arranged between and parallel to a process tube row and a furnace wall, thereby defining an outer burner row, whereby the burners of an outer burner row are heating at least one row of adjacent process tubes and the burners of an inner burner row are heating at least two rows of adjacent process tubes, is characterized in that a number of burners of an outer burner row is smaller than a number of burners of an inner burner row.

Following explanations of embodiments may refer to the above mentioned general process, the alternative general process or combinations thereof.

According to an embodiment, the outer burners are operating with a firing rate which is in the range of 90 to 110% of the firing rate of the inner burners, preferably in the range of 95 to 105% of the firing rate of the inner burners. More preferably, the outer burners and the inner burners are operating with an equal nominal firing rate. In this context, "equal nominal firing rate" means that the desired or target value for the parameter "firing rate" is equal for each burner, in particular equal for inner row burners and outer row burners, In practice, the measured firing rates may deviate from the nominal firing rates set for each of the burners of the furnace.

According to an embodiment, the inner burners are combusting gases at a burner discharge velocity of u m/s, and wherein the outer burners are combusting gases at a burner discharge velocity in a range of 0.85 to 1.15 u m/s, preferably 0.90 to 1.10 u m/s, more preferably 0.95 to 1.05 u m/s. The parameter "u" is the mean velocity of the air/fuel mixture injected through the burner nozzle. According to the aforementioned embodiment, the mean velocity $u_{ORB}$ of the air/fuel mixture injected through the outer row burner nozzle(s) is equal or at least similar to the mean velocity $u_{IRB}$ of the air/fuel mixture injected through the inner row burner nozzle(s). By applying equal or similar mean velocities $u_{ORB}$ and $u_{IRB}$, a low static pressure zone in the central section of the furnace, or vice versa, a high static pressure zone in the peripheral section of the furnace, is avoided. As a consequence, flame bending is avoided as well. In a further preferred embodiment, the inner burners and the outer burners are operating with a same nominal burner discharge velocity of u m/s. In this context, "nominal" burner discharge velocity means that the desired or target value for the parameter "burner discharge velocity" u is equal for each burner, in particular equal for inner row burners and outer row burners. In practice, the measured burner discharge velocities may deviate from the nominal burner discharge velocities set for each of the burners of the furnace.

According to an embodiment, the endothermic process is a steam methane reforming process. The process for operating a furnace for performing an endothermic process according to the invention is preferably used in, but not limited to, steam methane reforming processes. In steam methane reforming processes, natural gas comprising methane as the major component is reacted with steam to obtain synthesis gas, a gas mixture comprising at least hydrogen and carbon monoxide. The process according to the invention may be used in similar processes in which carbon containing feedstocks are converted by heat input to gas mixtures, with or without using a catalyst.

Problems underlying the invention are moreover solved at least in part by use of the furnace according to the invention in a steam methane reforming (SMR) process and/or use of the furnace according to the invention in a hydrocarbon steam cracking process.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 3a depicts flame shape profiles obtained from a burner arrangement of a furnace according to the state of the art;

FIG. 3b depicts flame shape profiles obtained from a burner arrangement of a furnace according to an embodiment of the invention;

DETAILED DESCRIPTION OF PREFERRED EMBODIMENTS

Figure 1:
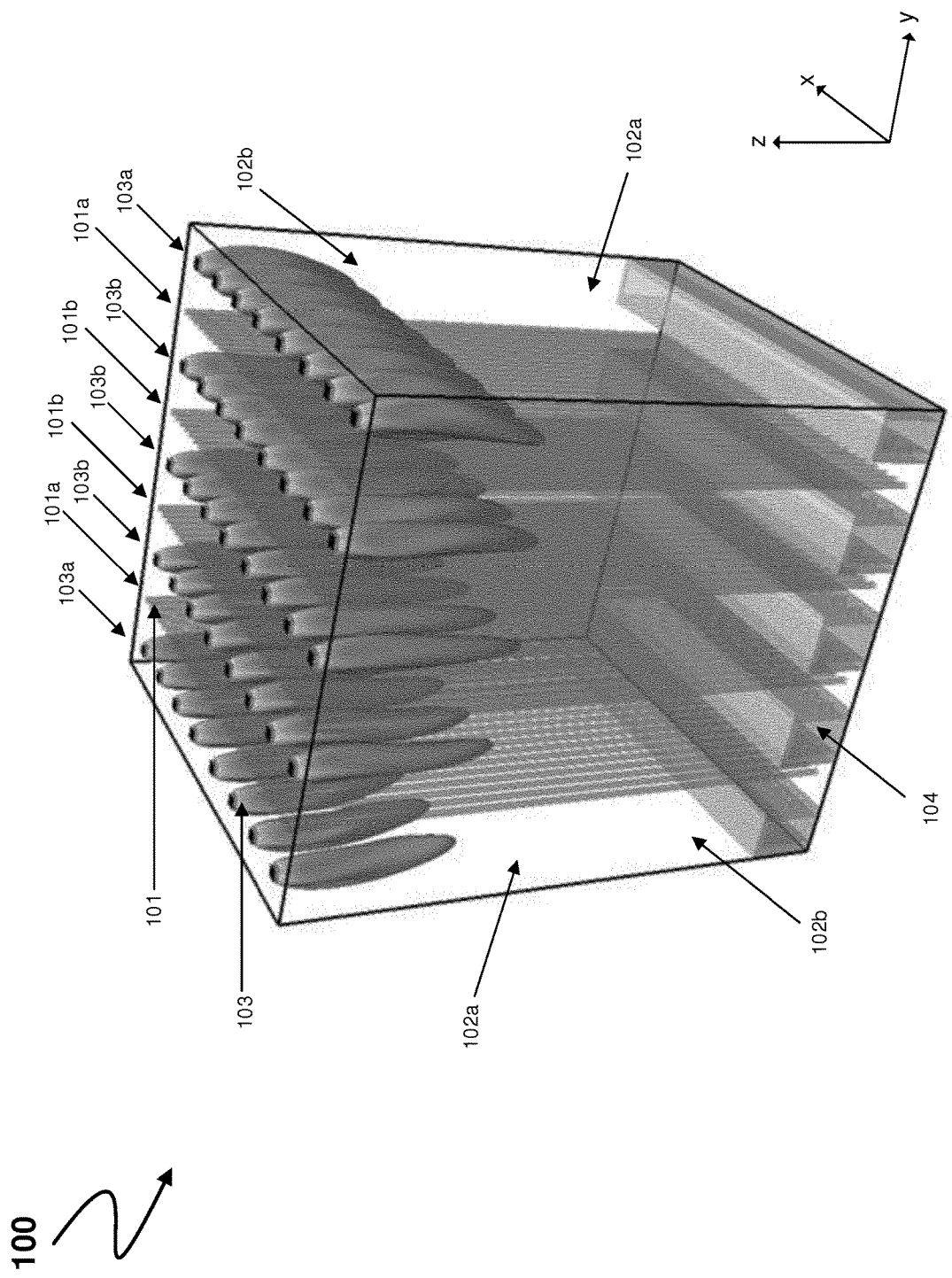
FIG. 1 depicts a perspective view of a typical furnace for performing an endothermic reaction according to the state of the art.

FIG. 1 shows a typical state of the art arrangement of a top-fired (down-fired) furnace 100 used to obtain a synthesis gas from a feed comprising, e.g., methane and steam. The furnace comprises facing furnace walls 102a, formed by the plane in x-z direction and facing furnace walls 102b, formed by the plane in y-z direction. All furnace walls 102a and 102b are provided with a refractory lining on their inner side.

Catalyst filled process tubes 101 are provided in four rows 101a and 101b with thirty process tubes each, each row of process tubes 101 thereby defining a process tube row. The two process tube rows 101a are arranged between and parallel to furnace walls 102a and process tube rows 101b, thereby defining outer process tube rows. The two process tube rows 101b are arranged between two process tube rows each, thereby defining inner process tube rows. Process tubes arranged adjacent to furnace walls 102b are referred to as end tubes. Each process tube row 101a, 101b comprises two end process tubes, the furnace in its entirety thereby comprising eight end process tubes.

Burners 103 are provided in five rows 103a and 103b with eight burners each, each row of burners 103 thereby defining a burner row. The two burner rows 103a are arranged between and parallel to furnace walls 102a and process tube rows 101a, thereby defining outer burner rows 103a. The two burner rows 103b are arranged between and parallel to process tube rows (101b, or 101a and 101b), thereby defining inner burner rows. Burners arranged adjacent to furnace walls 102b are referred to as end burners. Each burner row 103a, 103b comprises two end burners. Accordingly, ten burners according to the example of FIG. 1 can be referred to as end burners.

The feed of methane and steam is supplied through the process tubes 101 from top to the bottom, from where the resulting product, e.g. a synthesis gas comprising hydrogen, carbon monoxide and residuals, is withdrawn. The burners 103 fire vertically downwards from the top. The resulting flue gases are withdrawn through exhaust tunnels 104.

Figure 2A:
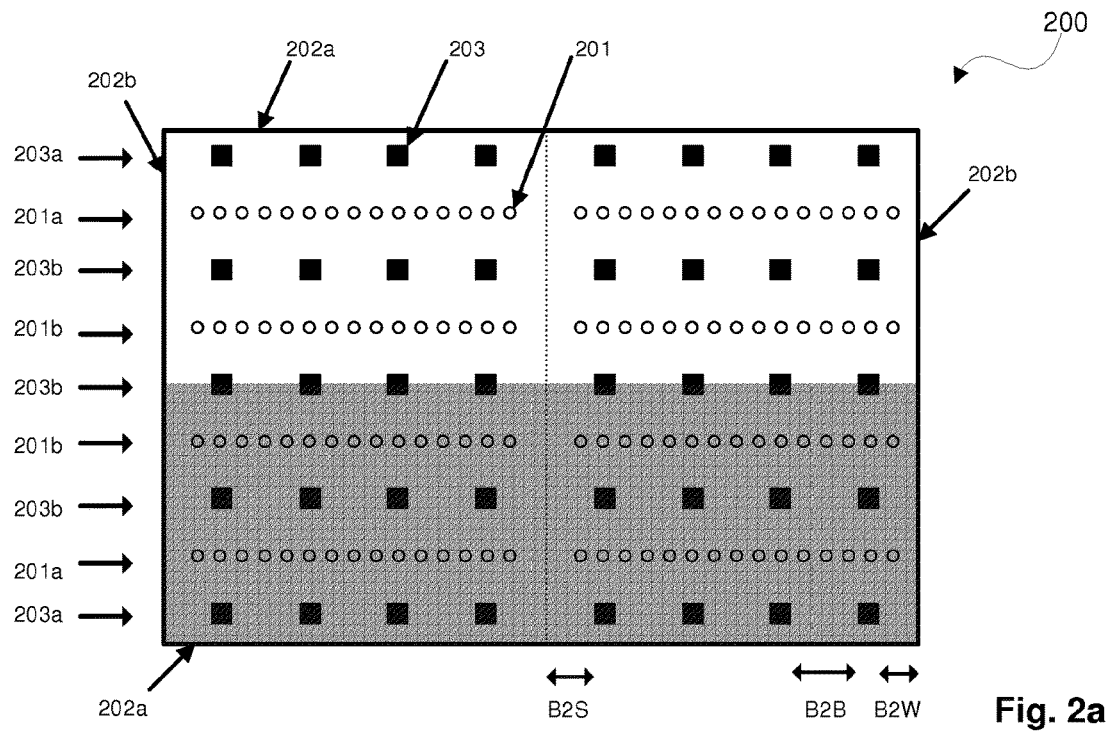
FIG. 2a depicts a top view of a burner arrangement of a furnace according to the state of the art.
Figure 2B:
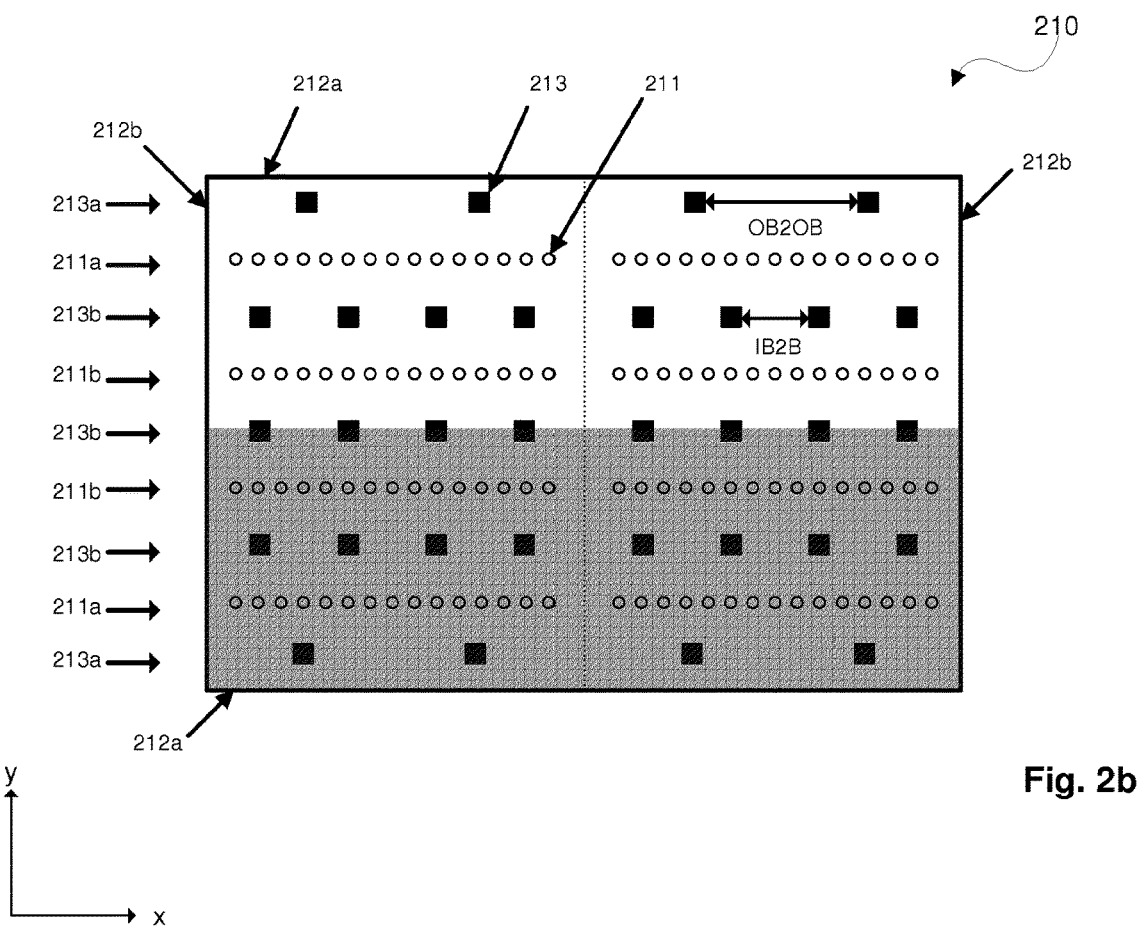
FIG. 2b depicts a top view of a burner arrangement of a furnace according to an embodiment of the invention.

FIGS. 2a and 2b depict top views of down-fired furnaces, whereby FIG. 2a represents a burner arrangement of a furnace 200 according to the state of the art and FIG. 2b represents a burner arrangement of a furnace 210 according to one embodiment of the invention. The rows of burners 203 and process tubes 201 extend in x-direction (analogous to the depiction of FIG. 1).

The furnace as depicted in FIG. 2a comprises five burner rows 203a and 203b, each burner row comprising eight burners 203, single burners represented by square dots. The furnace further comprises four process tube rows 201a and 201b, each process tube row comprising thirty process tubes 201, single process tubes represented by dots with circular shape. Burners 203 and process tubes 201 are enclosed by furnace walls 202a and 202b, each furnace wall being lined with a refractory material on its inner side.

A burner rows 203a is arranged between and parallel to a process tube row 201a and a furnace wall 202a, thereby defining an outer burner row 203a. The furnace wall(s) 202a may also be referred to as "parallel sided" walls. A burner row 203b is arranged between and parallel to two process tube rows (one process tube row per side), thereby defining an inner burner row 203b. A burner of an outer burner row 203a heats up one side of a process tube row 201a and the furnace wall 202a. A burner of an inner burner row 203b will heat up two sides of process tube rows 201a or 201b, and 201b. Since the burners of outer burner rows 203a heat up only one side of process tube rows, those burners are operated with only 78% of the firing rate of burners of inner burner rows 203b. The 78% firing rate value is well above the theoretical value of 52% to compensate for heat losses due to the flame bending effect as already described in detail above. However, the flame bending problem will still persist, and due to the increased firing rate it is difficult to equilibrate the heat duty among the process tube rows, regardless of the level of load.

The furnace as depicted in FIG. 2a is a fully symmetrical furnace. The burner rows 203a and 203b as well as the process tube rows 201a and 201b are organized in two sections. Since only a limited number of burners and or process tubes can be fixed to one suspension system, process tube rows and burner rows have to be separated in multiple sections. According to the example of FIG. 2a, the burner rows 203a, 203b are separated in two sections, four burners each. Process tube rows 201a, 201b are separated in two sections, fifteen process tubes each. The left and right sections of the furnace thereby defined are divided by a symmetry plane, indicated by the dotted line through the center of the furnace, From structural reasons, the distance between inter-sectional burners and/or process tubes is usually larger than the distance between intra-sectional burners. The distance between burners within one section of the furnace is referred to as "B2B" distance, and half the distance between two adjacent burners between two sections is referred to as "B2S" distance, as depicted in the drawing. Furthermore, the distance between a burner and the furnace wall 202b is referred to as "B2W". The furnace wall(s) 202b may also be referred to as "vertically sided" wall(s). Same considerations apply for distances between process tubes (not shown), referred to as "T2T" (distance between intra-sectional tubes), T2W (distance from tube to wall 202b) and "T2S" (half distance between adjacent inter-sectional tubes).

The furnace as depicted in FIG. 2b represents a furnace with a burner arrangement according to the invention.

The furnace as depicted in FIG. 2b comprises five burner rows 213a and 213b. The outer burner rows 213a comprise only four burners 213, whereas the inner burner rows 213b comprise eight burners 213 each. Again, single burners 213 are represented by square dots. The furnace further comprises four process tube rows 211a and 211b, each process tube row comprising thirty process tubes 211, the single process tubes represented by the dots with circular shape. Burners 213 and process tubes 211 are enclosed by furnace walls 212a and 212b, each furnace wall being lined with a refractory material on its inner side. Furnace wall(s) 212a may also be referred to as "parallel sided" furnace wall(s), whereas furnace wall(s) 212b may also be referred to as "vertically sided" furnace wall(s).

A burner rows 213a is arranged between and parallel to a process tube row 211a and a furnace wall 212a, thereby defining an outer burner row 213a. A burner row 213b is arranged between and parallel to two process tube rows (one process tube row per side), thereby defining an inner burner row 213b. A burner of an outer burner row 213b heats up one side of a process tube row 211a and the furnace wall 212a. A burner of an inner burner row 213b will heat up two sides of process tube rows 211a and 211b, or 211b.

According to the invention, the number of burners 213 of an outer burner row 213a is lower than the number of burners 213 of an inner burner row 213b. According to the arrangement of FIG. 2b, the number of burners 213 of the outer burner rows 213a is half of the number of burners 213 of the inner burner rows 213b. This applies to all of the burner rows, i.e. both of the outer burner rows 213a comprise only half of the number of burners compared to the number of burners of an inner burner row 213b. Accordingly, the ratio of the number of burners of an outer burner row 213a to the number of burners of an inner burner row is 0.5. The outer burner rows 213a with reduced number of burners are further adjacent to the inner burner rows 213b with a "standard" number of burners. According to the example of FIG. 2b, each inner burner row 213b further comprises the same number of burners and each outer burner row 213a comprises the same number of burners. The outer burners 213 of rows 213a are arranged offset to the inner burners 213 of rows 213b, i.e. the outer burners are not arranged "at the same x-coordinate" as the inner burners. The offset arrangement provides further benefits with regard to the homogeneity of the heat profile over the entire furnace and therefore homogeneity of the heat distribution of the process tubes.

In contrast to the comparative example of FIG. 2a, the burners of outer burner rows 213a according to the inventive example of FIG. 2b are configured for operating with a firing rate which is 100% of the firing rate of the burners of inner burner rows 213b. In other words, the outer burners of rows 213a and the inner burners of rows 213b are configured for operating with an equal nominal firing rate. Accordingly, as a further advantage of the present invention, outer burners and inner burners are constructed identically, so that only one type of burner is required for the entire furnace. Since all of the burners are constructed identically, it is easier to operate all of the burners with an equal burner discharge velocity, which further will reduce or even eliminate the flame bending effect. In other words, the inner burners of rows 213b and the outer burners of rows 213a can be operated in a way that they are combusting gases with a nearly equal or even equal burner discharge velocity u.

As further depicted in FIG. 2b, the distance between two adjacent burners of an inner burner row 213b is referred to as "IB2IB" and the distance between two adjacent burners of an outer row 213a is referred to as "OB2OB". According to the example of FIG. 2b, IB2B is approximately half of OB2OB. This applies for adjacent burners within one section ("intra-sectional" burners) as well as for adjacent burners between two sections ("inter-sectional burners").

Advantages of the present invention are further demonstrated by computational simulations in a quantitatively manner shown in FIGS. 3a and 3b.

FIG. 3a depicts a transverse view of the comparative example according to FIG. 2a, i.e. refers to the same burner arrangement. The graphical elements shown in FIG. 3a (and FIG. 3b) represent flame shapes as calculated by computational simulation. In x-direction, a single flame of a flame "stack" represents a single burner 203 of a burner row. The flame stack referred to as 303a represents an outer burner row 203a according to FIG. 2a. The flame stacks 303b represent two outer burner rows 203b according to FIG. 2a. For symmetry reason, only half of the furnace has been simulated, as indicated by the hatched area of FIG. 2a. The outer right flame stack of FIG. 3a (in y-direction) thereby represents only "half" of the center burner row 203b of FIG. 2a. Generally speaking, the left part of FIG. 3a represents the periphery area of the furnace and by moving from left to right in y-direction, the center area of the furnace is reached.

The shapes of the flames, in particular the shapes of the flames according to 303a, representing outer burners of burner row(s) 202a, show the typical flame bending for symmetrical top-fired furnaces according to the state of the art. The firing rate of the burners of the outer burner row is only 78% of the firing rate of the burners of the inner burner rows, so that outer burners have a lower momentum than inner burners. Hence, the hot burnt gases released by the outer burners are deflected (inter alia in y-direction) towards the center of the furnace.

FIG. 3b depicts a transverse view of an embodiment of the invention according to FIG. 2b, i.e. refers to the same burner arrangement. Again, the graphical elements shown in FIG. 3b represent flame shapes as calculated by computational simulation. In x-direction, a single flame of a flame "stack" represents a single burner 213 of a burner row. The flame stack referred to as 313a represents an outer burner row 213a according to FIG. 2b. The flame stacks 313b represent two outer burner rows 213b according to FIG. 2b. For symmetry reason, only half of the furnace has been simulated, as indicated by the hatched area of FIG. 2b. The outer right flame stack of FIG. 3b (in y-direction) thereby represents only "half" of the center burner row 213b of FIG. 2b. Generally speaking, the left part of FIG. 3b represents the periphery area of the furnace and by moving from left to right in y-direction, the center area of the furnace is reached.

The flame shapes according to FIG. 3b demonstrate that the bending of the flames of the outer burners (represented by the flame shapes of 313a) towards the center of the furnace is avoided. Since the firing rate of the outer burners (represented by flame shapes 313a) and inner burners (represented by flame shapes 313b) is the same, the combustion gases from inner and outer burners are discharged with a substantially uniform or same momentum. Accordingly, no or at least significantly less flame bending occurs. As an effect of the invention, the flames, in particular flames of 313a representing outer burners 213a, are essentially straight.

The improved burner arrangement according to the invention also results in a much better homogeneity with regard to temperature distribution at the reformer scale.

This is demonstrated by the simulated temperature profiles obtained from the burner arrangement according to the state of the art (FIGS. 2a and 3a) and according to the invention (FIGS. 2b and 3b). The temperature profile of process tubes according to FIG. 4a represents the comparative example, and the temperature profile of process tubes according to FIG. 4b represents the embodiment according to the invention.

Figure 4A:
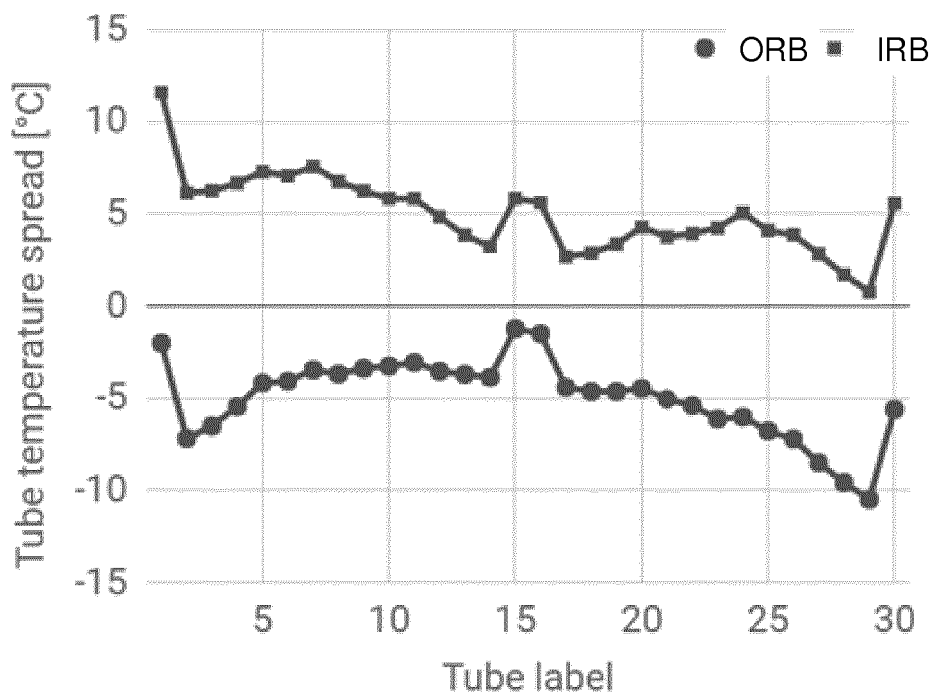
FIG. 4a depicts the temperature profile of process tubes in a furnace with a burner arrangement according to the state of the art.

As FIG. 4a shows, there is a significant difference in temperatures between process tubes next to the outer burner row (outer tubes represented by round dots=ORB) and tubes between inner burner rows (inner tubes represented by square dots=IRB). Due to the flame bending effect, i.e. flames bending towards the center of the furnace, inner tubes show significantly higher average temperatures. Accordingly, there is a significant temperature difference between inner and outer process tubes, also referred to as "temperature spread".

Figure 4B:
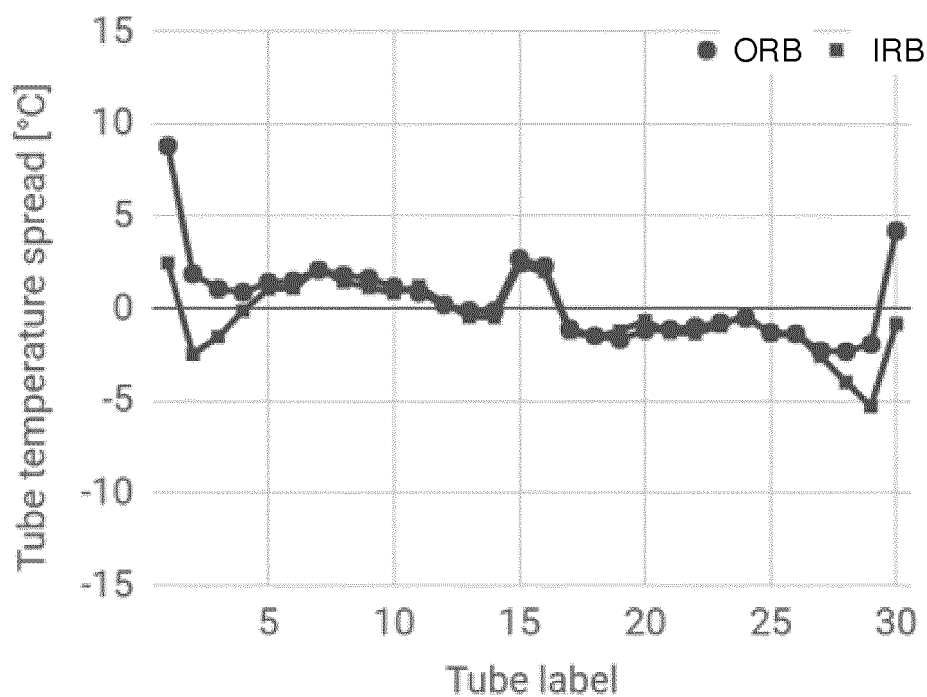
FIG. 4b depicts the temperature profile of process tubes in a furnace with a burner arrangement according to an embodiment of the invention.

By applying the burner arrangement according to the invention, this undesirable temperature spread is significantly reduced, as shown by the diagram of FIG. 4b. An essential part of inner and outer process tubes even show the same or at least substantially same temperature.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

LIST OF REFERENCE SIGNS 100 furnace
101 process tube
101a (outer) process tube row
101b (inner) process tube row
102a (parallel sided) furnace wall
102b (vertically sided) furnace wall
103 burner 103a (outer) burner row
103b (inner) burner row
104 exhaust tunnel
200 furnace
201 process tube
201a (outer) process tube row
201b (inner) process tube row
202a (parallel sided) furnace wall
202b (vertically sided) furnace wall
203 burner
203a (outer) burner row
210 furnace
211 process tube
211a (outer) process tube row
211b (inner) process tube row
212a (parallel sided) furnace wall
212b (vertically sided) furnace wall
213 burner
213a (outer) burner row
303a flame shape of outer burner
303b flame shape of inner burner
313a flame shape of outer burner
313b flame shape of inner burner It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above,

The invention claimed is:

1. A furnace for performing an endothermic process, comprising
    a plurality of process tubes containing a catalyst for converting a gaseous feed, wherein the process tubes are arranged in rows within the furnace, each row of process tubes thereby defining a process tube row,
    a plurality of inner burners arranged in rows, each row of inner burners being arranged between and parallel to process tube rows, thereby defining an inner burner row, and
    a plurality of outer burners arranged in rows, each row of outer burners being arranged between and parallel to a process tube row and a furnace wall, thereby defining an outer burner row,
    wherein a number of burners of an outer burner row is smaller than a number of burners of an inner burner row,
    wherein a distance between two inner burners of an inner burner row is IB2IB, and the distance between two outer burners of an outer burner row is OB2OB, and wherein the inner and outer burners in the rows are arranged in such a way that a ratio of IB2IB to OB2OB is 0.3 to 0.81.

2. The furnace of claim 1, wherein the number of burners of an outer burner row is smaller than a number of burners of an inner burner row adjacent to an outer burner row.

3. The furnace of claim 1, wherein a ratio of the number of burners of an outer burner row to the number of burners of an inner burner row is in a range of 0.25 to 0.75.

4. The furnace of claim 1, wherein each inner burner row of the furnace comprises the same number of burners and/or each outer burner row of the furnace comprises the same number of burners.

5. The furnace of claim 1, wherein the outer burners are configured for operating with a firing rate which is in the range of 85 to 115% of the firing rate of the inner burners.

6. The furnace of claim 1, wherein the outer burners and the inner burners are configured for operating with an equal nominal firing rate.

7. The furnace of claim 1, wherein the inner row burners and the outer row burners are constructed identically.

8. The furnace of claim 1, wherein the inner burner rows, the outer burner rows and the process tube rows are ended by vertically sided walls arranged perpendicular to the inner burner rows, the outer burner rows and the process tube rows, and wherein the inner burner rows, the outer burner rows and the process tube rows are divided into sections with the distance from an end inner burner or an end outer burner to the vertically sided wall being B2W, the distance between two adjacent inner or outer burners in the section being B2B, and half the distance in-between two sections being B2S, wherein the inner and outer burners in the rows are arranged in such a way that the ratios B2B/B2W and B2B/B2S are greater than 1.3.

9. The furnace of claim 1, wherein the burner rows and the process tube rows are ended by vertically sided walls arranged perpendicular to the burner rows and the process tube rows, and wherein the burner rows and the process tube rows are divided into sections with, on each row of process tubes, the distance from a wall end process tube to the vertically sided wall being T2W, the distance between two adjacent inner process tubes in a section being T2T, and the distance between two symmetry end process tubes of two adjacent sections being T2S, wherein the process tubes in the rows are arranged in such a way that the ratios T2T/T2W and T2T/T2S are greater than 0.5 and smaller than 2.

10. The furnace of claim 1, wherein the burners are mounted to a furnace roof configured for a down-fired arrangement or the burners are mounted to a furnace floor configured for an up-fired arrangement.

11. The furnace of claim 1, the furnace being a steam methane reforming furnace.

12. A furnace for performing an endothermic process, comprising
    a plurality of process tubes containing a catalyst for converting a gaseous feed, wherein the process tubes are arranged in rows within the furnace, each row of process tubes thereby defining a process tube row,
    a plurality of inner burners arranged in rows, each row of inner burners being arranged between and parallel to process tube rows, thereby defining an inner burner row, and
    a plurality of outer burners arranged in rows, each row of outer burners being arranged between and parallel to a process tube row and a furnace wall, thereby defining an outer burner row,
    wherein a number of burners of an outer burner row is smaller than a number of burners of an inner burner row,
    wherein the outer burners of an outer burner row are aligned offset, along the direction of the burner rows, to the inner burners of an inner burner row.

13. A furnace for performing an endothermic process, comprising
    a plurality of process tubes containing a catalyst for converting a gaseous feed, wherein the process tubes are arranged in rows within the furnace, each row of process tubes thereby defining a process tube row, a plurality of inner burners arranged in rows, each row of inner burners being arranged between and parallel to process tube rows, thereby defining an inner burner row, and a plurality of outer burners arranged in rows, each row of outer burners being arranged between and parallel to a process tube row and a furnace wall, thereby defining an outer burner row, wherein a number of burners of an outer burner row is smaller than a number of burners of an inner burner row, wherein the outer burners are positioned such that the distance of the central axis of the outer burners to the furnace wall is less than 25% of the distance between the outermost tubes and the furnace wall.

* * * * *